(12) United States Patent
Kawai

(10) Patent No.: US 12,173,177 B2
(45) Date of Patent: *Dec. 24, 2024

(54) TWO-PACK TYPE COATING COMPOSITION

(71) Applicant: NIPPON PAINT AUTOMOTIVE COATINGS CO., LTD., Osaka (JP)

(72) Inventor: Takashi Kawai, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 629 days.

This patent is subject to a terminal disclaimer.

(21) Appl. No.: 17/606,215

(22) PCT Filed: Apr. 24, 2020

(86) PCT No.: PCT/JP2020/017771
§ 371 (c)(1),
(2) Date: Oct. 25, 2021

(87) PCT Pub. No.: WO2020/218539
PCT Pub. Date: Oct. 29, 2020

(65) Prior Publication Data
US 2022/0204808 A1 Jun. 30, 2022

(30) Foreign Application Priority Data
Apr. 26, 2019 (JP) .................. 2019-086533

(51) Int. Cl.
C09D 175/06 (2006.01)
C09D 7/20 (2018.01)
C09D 175/08 (2006.01)
B05D 7/24 (2006.01)

(52) U.S. Cl.
CPC ............. *C09D 175/06* (2013.01); *C09D 7/20* (2018.01); *C09D 175/08* (2013.01); *B05D 7/24* (2013.01)

(58) Field of Classification Search
CPC ...... C09D 175/06; C09D 7/20; C09D 175/08; B05D 7/24
See application file for complete search history.

(56) References Cited

U.S. PATENT DOCUMENTS

| | | | |
|---|---|---|---|
| 5,387,750 A | 2/1995 | Chiang | |
| 5,962,142 A | 10/1999 | Tachi et al. | |
| 2004/0249108 A1 | 12/2004 | Dietrich et al. | |
| 2014/0248813 A1 | 9/2014 | Bolze et al. | |
| 2017/0274564 A1 | 9/2017 | Wade et al. | |
| 2022/0089922 A1* | 3/2022 | Narutaki | .................... C09J 7/30 |

FOREIGN PATENT DOCUMENTS

| | | |
|---|---|---|
| JP | 2-155723 | 6/1990 |
| JP | 10-204379 | 8/1998 |
| JP | 10-309733 | 11/1998 |
| JP | 11-323253 | 11/1999 |
| JP | 2004-359958 | 12/2004 |
| JP | 2017-534477 | 11/2017 |
| WO | 2010/113847 | 10/2010 |
| WO | 2018/186886 | 10/2018 |

OTHER PUBLICATIONS

Office Action issued Feb. 28, 2023 in corresponding Japanese Patent Application No. 2019-086533, with English language translation.
Extended European Search Report issued Nov. 9, 2022 in European Patent Application No. 20796045.1.
Japanese Office Action issued Aug. 29, 2023 in corresponding Japanese Patent Application No. 2019-086533, with English translation.
International Search Report (ISR) issued Jun. 30, 2020 in International (PCT) Application No. PCT/JP2020/017771.
International Preliminary Report on Patentability and Written Opinion of the International Searching Authority issued Sep. 28, 2021 in International (PCT) Application No. PCT/JP2020/017771.

* cited by examiner

*Primary Examiner* — Doris L Lee
(74) *Attorney, Agent, or Firm* — Wenderoth, Lind & Ponack, L.L.P.

(57) ABSTRACT

Provided is a coating composition that can be suitably used even in a coating method different from conventional spray coating. A two-pack coating composition comprising a main resin comprising a hydroxyl group-containing component and a curing catalyst (C), and a hardener comprising an isocyanate compound (B), wherein the hydroxyl group-containing component comprises a polyol (A), the polyol (A) has a hydroxyl value of 200 mg KOH/g or more and 1900 mg KOH/g or less, a content of the curing catalyst (C) is in a range of from 0.05 parts by mass to 3 parts by mass based on 100 parts by mass of the hydroxyl group-containing component, and an amount of an organic solvent contained in the two-pack coating composition is 5 parts by mass or less based on 100 parts by mass of the two-pack coating composition.

5 Claims, No Drawings

TWO-PACK TYPE COATING COMPOSITION

TECHNICAL FIELD

The present invention relates to a two-pack coating composition.

BACKGROUND ART

Articles such as industrial products often have coating films having various functions. For example, on the surface of an article to be coated such as parts constituting an automobile body is formed sequentially a plurality of coating films having various roles, and thus the article is protected and concurrently is provided with a beautiful appearance and an excellent design. In the coating of such articles to be coated, especially a coating film provided on the front side greatly affects the appearance and design of coated articles. Therefore, such a coating film is strongly required to have a good coating film appearance.

As coating compositions to be used for coating articles to be coated, for example, room temperature-curable coating compositions, thermosetting coating compositions, etc. are widely used. However, for example, the room temperature-curable coating compositions are problematic in that production efficiency in formation of a coating film is low because it takes a long time such as several hours to several days for a coating film to dry.

On the other hand, since the thermosetting coating compositions are subjected to a heating step during the curing of a coating film, the production efficiency in formation of a coating film has been improved as compared with the room temperature-curable coating compositions. However, in a thermal curing step, a coating composition is applied to an article to be coated to form a coating film, and then the article and the coating film are heated to cure the coating film. Therefore, there is a technical problem that an article to be coated having low heat resistance may be deformed in a heating step.

When a coating film is formed on an article to be coated which may be deformed in the heating step as described above, a method for forming a coating film using a multi-pack reactive coating composition (for example, a two-pack reactive coating composition) may be employed. For example, a two-pack reactive coating composition is generally composed of two agents reactive with each other (a main resin and a hardener), and mixing these agents causes a chemical reaction with each other, and a curing reaction proceeds. Such a reactive coating composition has an advantage that it is not necessary to heat an article to be coated and a coating film at a high temperature because a chemical reaction is caused by mixing.

Meanwhile, in the formation of a coating film using a coating composition, spray coating of a coating composition containing a solvent such as an organic solvent and/or an aqueous solvent has been commonly performed. On the other hand, spray coating has a technical problem such as restriction on release of a solvent such as an organic solvent to the atmosphere. Therefore, development of a coating method that can substitute for spray coating is also required.

For example, WO 2010/113847 A (Patent Literature 1) describes performing pressing in a method for producing an in-mold coated article (claims 2, 6, etc.).

CITATIONS LIST

Patent Literature

Patent Literature 1: WO 2010/113847 A

SUMMARY OF THE INVENTION

Technical Problems

Patent Literature 1 describes performing pressing in a method for producing an in-mold coated article. However, Patent Literature 1 does not describe in detail a coating composition that can be suitably used in the coating described above, for example. An object of the present invention is to provide a coating composition that can be suitably used in a coating method different from conventional spray coating.

Solutions to Problems

In order to solve the above-described problems, the present invention provides the following embodiments.

[1] A two-pack coating composition comprising:
  a main resin comprising a hydroxyl group-containing component and a curing catalyst (C); and
  a hardener comprising an isocyanate compound (B), wherein
  the hydroxyl group-containing component comprises a polyol (A),
  the polyol (A) has a hydroxyl value of 200 mg KOH/g or more and 1900 mg KOH/g or less,
  a content of the curing catalyst (C) is 0.05 parts by mass or more and to 3 parts by mass or less based on 100 parts by mass of the hydroxyl group-containing component, and
  an amount of an organic solvent contained in the two-pack coating composition is 5 parts by mass or less based on 100 parts by mass of the two-pack coating composition.

[2] The two-pack coating composition defined above, wherein the polyol (A) is one or more polyols selected from the group consisting of polyester polyol, polyether polyol, and polycarbonate polyol.

[3] The two-pack coating composition defined above, wherein a ratio of an isocyanate group equivalent of the isocyanate compound (B) to a hydroxyl group equivalent of the hydroxyl group-containing component is NCO equivalent/OH equivalent=0.5/1 or more and 2.0/1 or less.

[4] The two-pack coating composition defined above, wherein the curing catalyst (C) comprises one or more organometallic catalysts comprising a metal element selected from the group consisting of Bi, Zn, Al, Zr, and Sn.

[5] The two-pack coating composition defined above which is to be used for open press coating.

Advantageous Effects of Invention

The two-pack coating composition is composed of a main resin and a hardener, and the main resin comprises a hydroxyl group-containing component comprising a specific polyol (A) and a curing catalyst (C). By comprising these specific components, the two-pack coating composition has an advantage that it can be suitably used in a coating method different from conventional spray coating, such as a method for forming a coating layer by open press coating.

DESCRIPTION OF EMBODIMENTS

The coating composition is a two-pack coating composition composed of a main resin comprising a hydroxyl group-containing component and a curing catalyst (C), and a hardener comprising an isocyanate compound (B). The hydroxyl group-containing component comprises a polyol (A). In the following, respective components are described in detail.

Polyol (A)

The hydroxyl group-containing component contained in the main resin comprises a polyol (A) having two or more hydroxyl groups. The polyol (A) has a hydroxyl value of 200 mg KOH/g or more and 1900 mg KOH/g or less. Owing to the hydroxyl value of the polyol (A) being within the above range, when the main resin and the hardener are mixed, a reaction between the hydroxyl group-containing component comprising the polyol (A) and the isocyanate compound (B) proceeds at high speed. For this reason, a certain amount of reaction heat is generated during the curing reaction. This offers an advantage that the adhesion of the two-pack coating composition to a resin substrate is particularly improved. This leads to an advantage that the two-pack coating composition can be suitably used, for example, in a method for forming a coating layer by in-mold coating in which a coating layer is formed by injecting the two-pack coating composition into a mold, and a method for forming a coating layer by open press coating in which a coating surface is pressed after the two-pack coating composition is applied.

In both the method for forming a coating layer by in-mold coating and the method for forming a coating layer by open press coating, a step of diluting a resin component contained in a coating composition with a solvent is not essential in coating an article to be coated. In any of the methods for forming a coating layer by in-mold coating and open press coating, the resin component itself is to be directly applied to the article to be coated. Therefore, these can be collectively referred to as "direct coating".

The hydroxyl group-containing component contained in the main resin is preferably the polyol (A). When the polyol (A) is a mixture of two or more polyols, the calculated average value based on the hydroxyl value and the mass ratio of each polyol (A) needs to be within the range of from 200 mg KOH/g to 1900 mg KOH/g. As long as the calculated average value of the hydroxyl value is within the above range, the polyol (A) may be a mixture of a polyol having a hydroxyl value of 200 mg KOH/g or more and 1900 mg KOH/g or less and a polyol having a hydroxyl value of less than 200 mg KOH/g.

The polyol (A) may comprise a polyol having three or more OH functional groups per molecule. That the number of the OH functional groups per molecule is 3 or more offers an advantage that the hardness of a coating layer to be formed is in a good range.

Specific examples of the polyol (A) include polyester polyol, polyether polyol, polycarbonate polyol, and polyacrylate polyol. The polyol (A) is preferably one or more members selected from the group consisting of polyester polyol, polyether polyol, and polycarbonate polyol. As the polyol (A), only one polyol may be used, or two or more polyols may be used in combination.

Specific examples of the polyester polyol as one example of the polyol (A) include a polyester polyol having a branched structure. The polyol of a polyester having a branched structure can be prepared, for example, by reacting two or more polyvalent carboxylic acids with a trivalent or more polyhydric alcohol compound, and, as necessary, repeating this reaction.

The hydroxyl value of the polyester polyol is preferably 200 mg KOH/g or more and 1900 mg KOH/g or less, more preferably 200 mg KOH/g or more and 1300 mg KOH/g or less, further preferably 300 mg KOH/g or more and 700 mg KOH/g or less, and particularly preferably 400 mg KOH/g or more and 700 mg KOH/g or less.

The polyester polyol as one example of the polyol (A) can have a weight-average molecular weight (Mw) appropriately selected according to the molecular structure thereof. In the present description, the weight-average molecular weight (Mw) and the number-average molecular weight (Mn) can be determined by gel permeation chromatography (GPC) using a polystyrene standard sample.

As the polyester polyol, which is one example of the polyol (A), a commercially available product may be used. Examples of the commercially available product include Desmophen VPLS2249/1 (manufactured by Sumika Covestro Urethane Co., Ltd.), Desmophen 800 (manufactured by Sumika Covestro Urethane Co., Ltd.), KURARAY POLYOL P-510 (manufactured by Kuraray Co., Ltd.), and KURARAY POLYOL F-510 (manufactured by Kuraray Co., Ltd.).

Examples of the polyether polyol as one example of the polyol (A) include polyethylene glycol, polypropylene glycol, polytetramethylene glycol, and block bodies thereof. The polyether polyol may be prepared by adding ethylene oxide and/or propylene oxide to a polyhydric alcohol compound. According to the above procedure, a polyether polyol in which the number of OH functional groups per molecule is 2, 3, or more can be prepared.

The hydroxyl value of the polyether polyol is preferably 200 mg KOH/g or more and 1900 mg KOH/g or less, more preferably 200 mg KOH/g or more and 1300 mg KOH/g or less, and further preferably 200 mg KOH/g or more and 700 mg KOH/g or less.

The polyether polyol as one example of the polyol (A) can have a weight-average molecular weight (Mw) appropriately selected according to the molecular structure thereof.

As the polyether polyol as one example of the polyol (A), a commercially available product may be used. Examples of the commercially available product include the SANNIX series manufactured by Sanyo Chemical Industries, Ltd. Specific examples of the commercially available products include SANNIX GP-250, SANNIX PP-200, and SANNIX GP-600.

The polycarbonate polyol as one example of the polyol (A) can be prepared, for example, by reacting dimethyl carbonate with a polyvalent polyol.

The polycarbonate polyol as one example of the polyol (A) has a hydroxyl value of preferably 200 mg KOH/g or more and 500 mg KOH/g or less, more preferably 200 mg KOH/g or more and 300 mg KOH/g or less, and further preferably 200 mg KOH/g or more and 250 mg KOH/g or less.

The polycarbonate polyol as one example of the polyol (A) can have a weight-average molecular weight (Mw) appropriately selected according to the molecular structure thereof.

As the polycarbonate polyol as one example of the polyol (A), a commercially available product may be used. Examples of the commercially available product include DURANOL T5650E (manufactured by Asahi Kasei Corporation), C-590 (manufactured by Kuraray Co., Ltd.), and ETERNACOLL PH-50 (manufactured by Ube Industries, Ltd.).

As the polyol (A), a polyhydric alcohol having a hydroxyl value of 200 mg KOH/g or more and 1900 mg KOH/g or less can be further used. Examples of the polyhydric alcohol include ethylene glycol, glycerin, trimethylolpropane, propylene glycol, tetramethylene glycol, and pentaerythritol.

When the polyol (A) is a mixture of two or more polyols, the polyol (A) may be a mixture of a polyol having a hydroxyl value of 200 mg KOH/g or more and 1900 mg KOH/g or less and a polyol having a hydroxyl value of less than 200 mg KOH/g as long as the calculated average value based on the hydroxyl value and the mass ratio of each polyol (A) is within the range of from 200 mg KOH/g to 1900 mg KOH/g. Examples of the polyol having a hydroxyl value of less than 200 mg KOH/g include polyester polyols having a hydroxyl value of 50 mg KOH/g or more and less than 200 mg KOH/g and polycarbonate polyols having a hydroxyl value of 20 mg KOH/g or more and less than 200 mg KOH/g (preferably, having a hydroxyl value of 50 mg KOH/g or more and less than 200 mg KOH/g).

The hydroxyl group-containing component contained in the main resin of the two-pack coating composition may contain another polyol in addition to the polyol (A). When another polyol is used in combination with the polyol (A), the another polyol is required to be used in such an amount that the characteristics of the two-pack coating composition are not impaired.

Isocyanate Compound (B)

The two-pack coating composition is composed of a main resin and a hardener. The hardener comprises an isocyanate compound (B). The isocyanate compound (B) is not particularly limited as long as it is an isocyanate compound that is used as a hardener for a two-pack reactive composition. Examples of a representative isocyanate compound include:
- aromatic diisocyanates such as tolylene diisocyanate (TDI), 4,4'-diphenylmethane diisocyanate (MDI), xylylene diisocyanate (XDI), and meta-xylylene diisocyanate (MXDI);
- aliphatic diisocyanates such as hexamethylene diisocyanate (HDI), tetramethylene diisocyanate, 2-methylpentane-1,5-diisocyanate, 3-methyl-pentane-1,5-diisocyanate, lysine diisocyanate, and trioxyethylene diisocyanate;
- alicyclic diisocyanates such as isophorone diisocyanate (IPDI), cyclohexyl diisocyanate, 4,4'-dicyclohexylmethane diisocyanate, norbornane diisocyanate, hydrogenated tolylene diisocyanate, hydrogenated xylene diisocyanate, and hydrogenated tetramethyl xylene diisocyanate; and
- biuret forms, nurate forms, trimethylolpropane (TMP) adduct forms, and uretdione forms thereof. These may be used singly or two or more of them may be used in combination.

It is preferable to use an aliphatic diisocyanate, an alicyclic diisocyanate, or a biuret form, nurate form, trimethylolpropane (TMP) adduct form, uretdione form, or the like thereof as the isocyanate compound (B), and it is more preferable to use an aliphatic diisocyanate or a nurate form, biuret form, or the like of an aliphatic diisocyanate. The isocyanate compound (B) has characteristics of having a large number of functionality and a relatively low viscosity. Therefore, these isocyanate compounds (B) are advantageous in that they have high reactivity with the hydroxyl group-containing component in the main resin and can be suitably used in a method for forming a coating layer by in-mold coating.

Curing Catalyst (C)

The main resin of the two-pack coating composition comprises a curing catalyst (C) in addition to the hydroxyl group-containing component comprising the polyol (A). The curing catalyst (C) preferably comprises one or more organometallic catalysts comprising a metal element selected from the group consisting of Bi, Zn, Al, Zr, and Sn.

Examples of the organometallic catalyst comprising Bi include bismuth carboxylic acid and salts thereof.

Examples of the organometallic catalyst comprising Zn include zinc complex catalysts.

Examples of the organometallic catalyst comprising Al include aluminum complex catalysts.

Examples of the organometallic catalyst comprising Zr include zirconium chelate catalysts.

Examples of the organometallic catalyst comprising Sn include dialkyltin dicarboxylates such as dibutyltin dilaurate, dioctyltin dilaurate, and dibutyltin diacetate; tin oxide compounds such as dibutyltin oxide; and tin carboxylates such as tin 2-ethylhexanoate.

As the curing catalyst (C), a commercially available product may be used. Examples of the commercially available product include: K-KAT 348 (manufactured by Kusumoto Chemicals, Ltd.) and K-KAT XK-640 (manufactured by Kusumoto Chemicals, Ltd.), which are organometallic catalysts comprising Bi; K-KAT 4205, K-KAT XC-9213, K-KAT XC-A209, and K-KAT 6212 (manufactured by Kusumoto Chemicals, Ltd.), which are organometallic catalysts comprising Zr; K-KAT 5218 (manufactured by Kusumoto Chemicals, Ltd.), which is an organometallic catalyst comprising Al; K-KAT XK-314, K-KAT XK-635, K-KAT XK-639, and K-KAT XK-620 (manufactured by Kusumoto Chemicals, Ltd.), which are organometallic catalysts comprising Zn; and TVS tin lau (manufactured by Nitto Kasei Co., Ltd.), which is an organometallic catalyst comprising Sn.

The curing catalyst (C) preferably comprises an organometallic catalyst comprising Bi. Using an organometallic catalyst comprising Bi as the curing catalyst (C) offers an advantage that a two-pack coating composition particularly suitable for the method for forming a coating layer by open press coating can be obtained. The curing catalyst (C) is particularly preferably a bismuth carboxylate.

The content of the curing catalyst (C) is 0.05 parts by mass or more and 3 parts by mass or less based on 100 parts by mass of the hydroxyl group-containing component. The content is preferably 0.15 parts by mass or more and 2.5 parts by mass or less based on 100 parts by mass of the hydroxyl group-containing component.

Two-Pack Coating Composition

The two-pack coating composition is composed of a main resin comprising a hydroxyl group-containing component and a curing catalyst (C), and a hardener comprising an isocyanate compound (B). The amount of an organic solvent contained in the two-pack coating composition is 5 parts by mass or less based on 100 parts by mass of the two-pack coating composition. That the content of the organic solvent is 5 parts by mass or less offers an advantage that the two-pack coating composition can be particularly suitably used for a method for forming a coating layer by open press coating.

The two-pack coating composition may comprise other components as necessary. Examples of such other components include additives that can be usually used in the coating field and the paint field. Specific examples of the additives include various pigments, surface conditioners, viscosity adjusting agents, antioxidants, ultraviolet inhibitors, antifoaming agents, catalyst aids, rust inhibitors, sedimentation inhibitors, and dispersants.

The additives may be contained in the main resin of the two-pack coating composition or may be contained in the hardener as long as the stability of the components is not impaired. The blending amount in the case of using the additives may be within a range commonly used by those skilled in the art.

Each of the main resin comprising the polyol (A) and the curing catalyst (C) and the hardener comprising the isocyanate compound (B) of the two-pack coating composition can be prepared by commonly used methods using devices commonly used in the art.

In the two-pack coating composition, the ratio of an isocyanate group equivalent of the isocyanate compound (B) to a hydroxyl group equivalent of the hydroxyl group-containing component (isocyanate group equivalent/hydroxyl group equivalent) is preferably NCO equivalent/OH equivalent=0.5/1 or more and 2.0/1 or less, and more preferably NCO equivalent/OH equivalent=0.9/1 or more and 1.2/1 or less.

That the ratio of the isocyanate group equivalent to the hydroxyl group equivalent is within the above range offers an advantage that the two-pack coating composition can be suitably used particularly for forming a coating layer by open press coating.

The coating layer by open press coating is formed, for example, by the following method.

A method for forming a coating layer, comprising:
a coating step of coating a surface of a resin substrate with the two-pack coating composition; and
a pressed coating layer-forming step of pressing the coating surface provided in the coating step to form a coating layer.

The forming method is a method characterized by pressing the coating surface provided in the coating step. Therefore, that the content of the curing catalyst (C) is 0.05 parts by mass or more and 3 parts by mass or less based on 100 parts by mass of the hydroxyl group-containing component and the amount of the organic solvent contained in the two-pack coating composition is 5 parts by mass or less offers an advantage that a coating layer having good appearance and good physical properties can be formed.

In the method for forming a coating layer by open pressing, the viscosity of the two-pack coating composition at the time of injection is preferably in the range of from 100 mPa·s to 500 mPa·s. Such a viscosity can be suitably adjusted by using the two-pack coating composition described above. If necessary, the main resin of the two-pack coating composition may be heated to adjust the viscosity to the range mentioned above.

In the coating layer forming method, the resin substrate mentioned above may be made of a thermoplastic resin or a thermosetting resin. Examples of the resin constituting the resin substrate include polypropylene (PP) resin, acrylonitrile•butadiene•styrene copolymer (ABS resin), polycarbonate (PC)/ABS resin, PC/acrylonitrile•ethylene-propylene-diene•styrene copolymer (AES resin), AES resin, PC/polybutylene terephthalate (PBT) resin, PC/polyethylene terephthalate (PET) resin, PC resin, polymethyl methacrylate (PMMA) resin, GF-PBT resin, GF-polyamide (PA) resin, Noryl•GTX resin, polyvinyl chloride (PVC resin), acrylonitrile•styrene•acrylic (ASA) resin, carbon fiber-reinforced plastic (CFRP resin), and glass fiber-reinforced plastic (GFRP resin).

The two-pack coating composition is composed of a main resin comprising a hydroxyl group-containing component and a curing catalyst (C), and a hardener comprising an isocyanate compound (B). The hydroxyl group-containing component comprises a polyol (A) having a hydroxyl value of 200 mg KOH/g or more and 1900 mg KOH/g or less. The content of the curing catalyst (C) is 0.05 parts by mass or more and 3 parts by mass or less based on 100 parts by mass of the hydroxyl group-containing component. Owing to using the polyol (A) and the curing catalyst (C) in combination in the two-pack coating composition, it becomes possible to suitably use the two-pack coating composition particularly for open press coating.

In open press coating, since a coating layer is formed by pressing a coating surface after applying a composition, it is necessary to cure the composition in a relatively short time to such an extent that pressing can be performed after the application of the composition. The two-pack coating composition is characteristic in that it can be applied easily, it can be pressed because it is cured in a relatively short time, and it can be cured rapidly due to high reactivity of the main resin and the hardener. Therefore, the two-pack coating composition has an advantage that it can be suitably used for open press coating.

In the pressing and coating layer-forming step, the pressing part to be used for pressing the coating surface is not limited. The pressing part may have been subjected to processing such as mold release processing as necessary.

The two-pack coating composition can be suitably used in open press coating. On the other hand, the two-pack coating composition can also be used in a coating method other than open press coating. The use of the two-pack coating composition in other coating methods is not excluded.

The coating layer formed from the two-pack coating composition is characteristic in that it has good appearance and superior adhesion and is superior in scratch resistance. The two-pack coating composition can be suitably used in automobile applications (vehicle exterior, interior, repair, etc.), building applications, home electric appliance applications, and information device applications (e.g., personal computers, mobile phones, and mobile devices).

EXAMPLES

The present invention will be described hereafter in more detail by way of examples, to which the present invention is not intended to be limited. In the examples, "parts" and "%" are on a mass basis unless otherwise indicated.

Example 1 Production of Two-Pack Coating Composition

A main resin was prepared by mixing 100 parts of SANNIX GP-250 (manufactured by Sanyo Chemical Industries, Ltd.) as the polyol (A) and 0.3 parts (active ingredient amount) of K-KAT XK-640 (manufactured by Kusumoto Chemicals, Ltd.) as the curing catalyst (C).

The hardener used was 218 parts of N 3600 (manufactured by Sumika Covestro Urethane Co., Ltd.) as the isocyanate compound (B).

Example 2 to 20 and Comparative Example 1 to 7 Production of Two-Pack Coating Compositions A main resin and a hardener were prepared and a two-pack coating composition was prepared by the same procedure as in Example 1 except that the type and amount of each component were changed as shown in the following tables.

In Examples 18 to 20 and Comparative Example 7, ethyl acetate as an organic solvent was mixed with the main resin.

Using the two-pack coating compositions prepared in Examples and Comparative Examples, the following evaluations were carried out. The results of the evaluations are shown in the following tables.

Preparation of Evaluation Test Plate

A masking tape (thickness: 200 μm) as a spacer was stuck on an ABS resin plate as a substrate.

In the preparation of the two-pack coating composition obtained in each Example or Comparative Example, first, only the main resin components were mixed using a planetary centrifugal mixer having defoaming performance. Subsequently, a hardener component was mixed with the main resin components. After the hardener component was added, mixing was performed for 15 seconds. The mixture obtained was applied to the substrate, and then pressed on its coating surface using a PP substrate (pressing part), thereby forming a coating layer having a thickness corresponding to the spacer.

Measurement of Hardness of Coating Layer

The evaluation test plate was left standing at 23° C. for 72 hours, and then heated at 80° C. for 20 minutes. Thereafter, the hardness of the coating layer was measured by the following procedure.

The pencil used was a Mitsubishi UNI pencil for a scratch value test. In the measurement, the evaluation test plate was placed on a horizontal table and fixed. With the pencil held such that the angle between the evaluation test plate and the pencil with the lead thereof exposed in a cylindrical shape was 45 degrees and with the lead pressed against the evaluation test plate as strongly as possible with the pencil prevented from breaking, the pencil was pushed forward at a speed of about 1 cm/sec to scratch the coating surface. A plurality of pencils having different ranks were prepared. The above operation was performed five times using pencils having the same rank. Among the pencils by which scratches or tears were generated twice or more in the coating layer and the pencils with which scratches or tears were generated less than twice in the coating layer, two pencils adjacent to each other in terms of rank were found, and the rank of the pencil by which scratches or tears were generated less than twice was defined as the pencil hardness of the coating layer.

Evaluation Criteria
- ⊚: Rank F or more
- ○: In a range of from rank HB to rank B
- x: Less than rank B Evaluation of Coating Workability In the preparation of the two-pack coating composition obtained in each Example or Comparative Example, first, only the main resin components were mixed using a planetary centrifugal mixer having defoaming performance. Subsequently, a hardener component was mixed with the main resin components. After the hardener component was added, mixing was performed for 15 seconds, and a sample was taken out.

The time when the sample was taken out was defined as a coating operation time start: 0 seconds, and the sample taken out was stirred with a spatula. The time required for the sample to reach a state in which the fluidity was lost due to the curing reaction between the main resin and the hardener and the sample did not immediately drop was measured as a coating operation time, and was evaluated according to the following criteria.

Evaluation Criteria
- ⊚: The coating operation time is 60 seconds or more and less than 600 seconds.
- ○: The coating operation time is 30 seconds or more and less than 60 seconds, or 600 seconds or more and less than 900 seconds.
- x: The coating operation time is less than 30 seconds or 900 seconds or more.

Evaluation of Appearance of Coating Layer

The evaluation test plate was left standing at 23° C. for 72 hours, and then heated at 80° C. for 20 minutes.

The appearance of the evaluation test plate obtained was visually evaluated according to the following criteria.

Evaluation Criteria
- ⊚: None of generation of granular matter, generation of bubble entrainment, and generation of nest holes (holes in which air easily accumulates) are observed.
- ○: Entrainment of bubbles is slightly observed.
- x: One or more of generation of granular matter, generation of bubble entrainment, and generation of nest holes (holes in which air easily accumulates) are clearly observed.

TABLE 1

| | | | Example 1 | Example 2 | Example 3 | Example 4 | Example 5 | Example 6 | Example 7 |
|---|---|---|---|---|---|---|---|---|---|
| Formulation | Polyol (A) | Desmophen VPLS2249/1 | | 100 | 50 | | | | |
| | | SANNIX GP-250 | 100 | | | | | 60 | |
| | | KURARAY POLYOL P-510 | | | 50 | | | | |
| | | DURANOL T5650E | | | | | 100 | | |
| | | SANNIX PP-200 | | | | | | | 100 |
| | | SANNIX GP-600 | | | | 100 | | | |
| | | Ethylene glycol | | | | | | | |
| | | SANNIX PP-950 | | | | | | | |
| | | SANNIX GP-1500 | | | | | | 40 | |
| | | SANNIX FA-757 | | | | | | | |
| | Isocyanate compound (B) | N 3600 (nurate) | 218 | 167 | 122 | 91 | 73 | 145 | 182 |
| | | N 3400 (dimer) | | | | | | | |
| | | 24A-100 (biuret) | | | | | | | |
| | Curing catalyst (C) | K-KAT XK-640 | 0.3 | 0.3 | 0.3 | 0.3 | 0.3 | 0.3 | 0.3 |
| | | TVS TIN LAU | | | | | | | |
| | Organic solvent (D) | AcEt | 0 | 0 | 0 | 0 | 0 | 0 | 0 |
| | | Amount of catalyst [phr] | 0.3 | 0.3 | 0.3 | 0.3 | 0.3 | 0.3 | 0.3 |
| | | OHV | 670 | 512 | 374 | 280 | 225 | 446 | 560 |
| | | NCO equivalent/OH equivalent | 1.0 | 1.0 | 1.0 | 1.0 | 1.0 | 1.0 | 1.0 |
| Evaluation results | | Viscosity measurement | ⊚ | ⊚ | ○ | ⊚ (Recovery) | ⊚ | ⊚ | ○ |
| | | Evaluation of coating workability | ○ | ○ | ○ | ○ | ○ | ○ | ○ |
| | | Evaluation of appearance of coating layer | ○ | ○ | ○ | ○ | ○ | ○ | ○ |

TABLE 1-continued

| | | | Example 8 | Example 9 | Example 10 | Example 11 | Example 12 | Example 13 | Example 14 |
|---|---|---|---|---|---|---|---|---|---|
| Formulation | Polyol (A) | Desmophen VPLS2249/1 | | | | | | | |
| | | SANNIX GP-250 | | 100 | 100 | 100 | 100 | 100 | 100 |
| | | KURARAY POLYOL P-510 | | | | | | | |
| | | DURANOL T5650E | | | | | | | |
| | | SANNIX PP-200 | | | | | | | |
| | | SANNIX GP-600 | | | | | | | |
| | | Ethylene glycol | 100 | | | | | | |
| | | SANNIX PP-950 | | | | | | | |
| | | SANNIX GP-1500 | | | | | | | |
| | | SANNIX FA-757 | | | | | | | |
| | Isocyanate compound (B) | N 3600 (nurate) | 589 | | | 218 | 218 | 218 | 218 |
| | | N 3400 (dimer) | | 230 | | | | | |
| | | 24A-100 (biuret) | | | 218 | | | | |
| | Curing catalyst (C) | K-KAT XK-640 | 0.3 | 0.3 | 0.3 | 3 | 0.15 | | |
| | | TVS TIN LAU | | | | | | 0.15 | 1.5 |
| | Organic solvent (D) | AcEt | 0 | 0 | 0 | 0 | 0 | 0 | 0 |
| | | Amount of catalyst [phr] | 0.3 | 0.3 | 0.3 | 3 | 0.15 | 0.15 | 1.5 |
| | | OHV | 1809 | 670 | 670 | 670 | 670 | 670 | 670 |
| | | NCO equivalent/OH equivalent | 1.0 | 1.0 | 1.0 | 1.0 | 1.0 | 1.0 | 1.0 |
| Evaluation results | | Viscosity measurement | ○ | ○ | ○ | ○ | ○ | ○ | ○ |
| | | Evaluation of coating workability | ○ | ○ | ○ | ○ | ○ | ○ | ○ |
| | | Evaluation of appearance of coating layer | ○ | ○ | ○ | ○ | ○ | ○ | ○ |

TABLE 2

| | | | Example 15 | Example 16 | Example 17 | Example 18 | Example 19 | Example 20 | Comparative Example 1 |
|---|---|---|---|---|---|---|---|---|---|
| Formulation | Polyol (A) | Desmophen VPLS2249/1 | | | | | | | |
| | | SANNIX GP-250 | 100 | 100 | 100 | 100 | 100 | 50 | 10 |
| | | KURARAY POLYOL P-510 | | | | | | | |
| | | DURANOL T5650E | | | | | | | |
| | | SANNIX PP-200 | | | | | | | |
| | | SANNIX GP-600 | | | | | | | |
| | | Ethylene glycol | | | | | | 50 | |
| | | SANNIX PP-950 | | | | | | | |
| | | SANNIX GP-1500 | | | | | | | 90 |
| | | SANNIX FA-757 | | | | | | | |
| | Isocyanate compound (B) | N 3600 (nurate) | 218 | 109 | 436 | 218 | 218 | 400 | 55 |
| | | N 3400 (dimer) | | | | | | | |
| | | 24A-100 (biuret) | | | | | | | |
| | Curing catalyst (C) | K-KAT XK-640 | | 0.3 | 0.3 | 0.3 | 0.3 | 0.3 | 0.3 |
| | | TVS TIN LAU | 0.05 | | | | | | |
| | Organic solvent (D) | AcEt | 0 | 0 | 0 | 1 | 5 | 0 | 0 |
| | | Amount of catalyst [phr] | 0.05 | 0.3 | 0.3 | 0.3 | 0.3 | 0.3 | 0.3 |
| | | OHV | 670 | 670 | 670 | 670 | 670 | 1230 | 168 |
| | | NCO equivalent/OH equivalent | 1.0 | 0.5 | 2.0 | 1.0 | 1.0 | 1.0 | 1.0 |
| Evaluation results | | Viscosity measurement | ○ | ○ | ○ | ○ | ○ | ○ | ○ |
| | | Evaluation of coating workability | ○ | ○ | ○ | ○ | ○ | ○ | x |
| | | Evaluation of appearance of coating layer | ○ | ○ | ○ | ○ | ○ | ○ | ○ |

| | | | Comparative Example 2 | Comparative Example 3 | Comparative Example 4 | Comparative Example 5 | Comparative Example 6 | Comparative Example 7 |
|---|---|---|---|---|---|---|---|---|
| Formulation | Polyol (A) | Desmophen VPLS2249/1 | | | | | | |
| | | SANNIX GP-250 | | | | 100 | 100 | 100 |
| | | KURARAY POLYOL P-510 | | | | | | |
| | | DURANOL T5650E | | | | | | |
| | | SANNIX PP-200 | | | | | | |
| | | SANNIX GP-600 | | | | | | |
| | | Ethylene glycol | | | | | | |
| | | SANNIX PP-950 | 100 | | | | | |
| | | SANNIX GP-1500 | | 100 | | | | |
| | | SANNIX FA-757 | | | 100 | | | |
| | Isocyanate compound (B) | N 3600 (nurate) | 38 | 36 | 10 | 218 | 218 | 218 |
| | | N 3400 (dimer) | | | | | | |
| | | 24A-100 (biuret) | | | | | | |
| | Curing catalyst (C) | K-KAT XK-640 | 0.3 | 0.3 | 0.3 | 4 | | 0.3 |
| | | TVS TIN LAU | | | | | 0.01 | |
| | Organic solvent (D) | AcEt | 0 | 0 | 0 | 0 | 0 | 7 |

TABLE 2-continued

|  |  |  |  |  |  |  |  |
|---|---|---|---|---|---|---|---|
|  | Amount of catalyst [phr] | 0.3 | 0.3 | 0.3 | 4 | 0.01 | 0.3 |
|  | OHV | 118 | 112 | 32 | 670 | 670 | 670 |
|  | NCO equivalent/OH equivalent | 1.0 | 1.0 | 1.0 | 1.0 | 1.0 | 1.0 |
| Evaluation results | Viscosity measurement | ○ | ○ | x | ○ | x | ○ |
|  | Evaluation of coating workability | x | x | ○ | x | x | ○ |
|  | Evaluation of appearance of coating layer | ○ | ○ | ○ | ○ | ○ | x |

The components in the above tables are as follows.

Component (A)
  Desmophen VPLS2249/1 (manufactured by Sumika Covestro Urethane Co., Ltd.)
  KURARAY POLYOL P-510 (manufactured by Kuraray Co., Ltd.)
  SANNIX GP-250 (manufactured by Sanyo Chemical Industries, Ltd.)
  SANNIX PP-200 (manufactured by Sanyo Chemical Industries, Ltd.)
  SANNIX GP-600 (manufactured by Sanyo Chemical Industries, Ltd.)
  DURANOL T5650E (manufactured by Asahi Kasei Corporation)
  SANNIX PP-950 (manufactured by Sanyo Chemical Industries, Ltd.)
  SANNIX GP-1500 (manufactured by Sanyo Chemical Industries, Ltd.)
  SANNIX FA-757 (manufactured by Sanyo Chemical Industries, Ltd.)

Component (B)
  Desmodur N 3600 (manufactured by Sumika Covestro Urethane Co., Ltd.)
  Desmodur N 3400 (manufactured by Sumika Covestro Urethane Co., Ltd.)
  Duranate 24A-100 (manufactured by Asahi Kasei Corporation)

Component (C)
  K-KAT XK-640 (manufactured by Kusumoto Chemicals, Ltd.)
  TVS TIN LAU (manufactured by Nitto Kasei Co., Ltd.)

All of the two-pack coating compositions of Examples 1 to 20 were superior in coating workability, and the appearance and hardness of the coating layers obtained were also good.

Comparative Examples 1 to 4 are examples in which the hydroxyl value of a polyol is less than 200 mg KOH/g. In these examples, it was confirmed that the coating workability or the hardness of a coating layer was poor.

Comparative Example 5 is an example in which the content of a curing catalyst (C) exceeds 3 parts by mass. In this example, it was confirmed that coating workability was poor in formation of a coating layer by open press coating.

Comparative Example 6 is an example in which the content of a curing catalyst (C) is less than 0.05 parts by mass. In this example, it was confirmed that the coating workability and the hardness of a coating layer were poor in formation of the coating layer by open press coating.

Comparative Example 7 is an example in which the content of an organic solvent exceeds 5 parts by mass. In this example, it was confirmed that the appearance of the resulting coating layer was poor.

INDUSTRIAL APPLICABILITY

The two-pack coating composition is composed of a main resin and a hardener, and the main resin comprises a hydroxyl group-containing component comprising a specific polyol (A) and a curing catalyst (C). By comprising these specific components, the two-pack coating composition has an advantage that it can be suitably used in a coating method different from conventional spray coating, such as a method for forming a coating layer by open press coating.

This application claims priority based on Japanese Patent Application No. 2019-086533, which was filed in Japan on Apr. 26, 2019, the disclosure of which application is incorporated herein by reference in its entirety.

The invention claimed is:

1. A two-pack coating composition comprising:
   a main resin comprising a hydroxyl group-containing component and a curing catalyst (C); and
   a hardener comprising an isocyanate compound (B), wherein
   the hydroxyl group-containing component comprises a polyol (A),
   the polyol (A) has a hydroxyl value of 200 mg KOH/g or more and 1900 mg KOH/g or less,
   a content of the curing catalyst (C) is 0.05 parts by mass or more and 3 parts by mass or less based on 100 parts by mass of the hydroxyl group-containing component, and
   an amount of an organic solvent contained in the two-pack coating composition is 5 parts by mass or less based on 100 parts by mass of the two-pack coating composition.

2. The two-pack coating composition according to claim 1, wherein the polyol (A) is one or more polyols selected from the group consisting of polyester polyol, polyether polyol, and polycarbonate polyol.

3. The two-pack coating composition according to claim 1, wherein a ratio of a hydroxyl group equivalent of the hydroxyl group-containing component to an isocyanate group equivalent of the isocyanate compound (B) is NCO equivalent/OH equivalent=0.5/1 or more and 2.0/1 or less.

4. The two-pack coating composition according to claim 1, wherein the curing catalyst (C) comprises one or more organometallic catalysts comprising a metal element selected from the group consisting of Bi, Zn, Al, Zr, and Sn.

5. The two-pack coating composition according to claim 1 which is to be used for open press coating.

* * * * *